US010409397B2

(12) United States Patent
Tsai et al.

(10) Patent No.: US 10,409,397 B2
(45) Date of Patent: Sep. 10, 2019

(54) MOUSE WITH SOUNDLESS SCROLL WHEEL MODULE

(71) Applicant: Primax Electronics Ltd., Taipei (TW)

(72) Inventors: Yung-Ming Tsai, Taipei (TW); Chun-Che Wu, Taipei (TW); Chun-Nan Su, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 17 days.

(21) Appl. No.: 15/835,978

(22) Filed: Dec. 8, 2017

(65) Prior Publication Data

US 2019/0094991 A1 Mar. 28, 2019

(30) Foreign Application Priority Data

Sep. 22, 2017 (TW) .............................. 106132660 A

(51) Int. Cl.
*G06F 3/0362* (2013.01)
*G06F 3/0354* (2013.01)
*G06F 3/033* (2013.01)

(52) U.S. Cl.
CPC ............ *G06F 3/0362* (2013.01); *G06F 3/033* (2013.01); *G06F 3/03543* (2013.01)

(58) Field of Classification Search
CPC ...... G06F 3/033; G06F 3/0317; G06F 3/0354; G06F 3/03541; G06F 3/03543; G06F 3/03544; G06F 3/0362
See application file for complete search history.

(56) References Cited

U.S. PATENT DOCUMENTS

| 6,137,477 A * | 10/2000 | Hu ....................... G06F 3/03543 341/35 |
| 6,157,369 A * | 12/2000 | Merminod ............ G06F 3/0312 345/157 |
| 6,246,392 B1 * | 6/2001 | Wu ......................... G06F 3/016 345/156 |
| 6,348,913 B1 * | 2/2002 | Cho ....................... G06F 1/1616 345/163 |
| 6,563,490 B1 * | 5/2003 | Wang .................... G06F 3/0312 345/165 |
| 2003/0201979 A1 * | 10/2003 | Sandage ................ G06F 3/016 345/164 |

(Continued)

OTHER PUBLICATIONS

Merriam Webster, (Aug. 31, 2014), https://web.archive.org/web/20140831143237/https://www.merriam-webster.com /dictionary/ratchet, Retrieved from URL Feb. 23, 2019.*

*Primary Examiner* — Darlene M Ritchie
(74) *Attorney, Agent, or Firm* — Muncy, Geissler, Olds & Lowe, P.C.

(57) ABSTRACT

The present invention provides a mouse with a soundless scroll wheel module, including a mouse body and a soundless scroll wheel module. The soundless scroll wheel module includes a supporting frame, a scroll wheel body, a mute inner ratchet wheel, a strut, an elastic component, and an encoding component. The mute inner ratchet wheel is installed in the scroll wheel body. The strut includes an engagement segment and the engagement segment is engaged with the mute inner ratchet wheel. The mute inner ratchet wheel comprises a flexible annular body and multiple flexible ratchets for reducing rolling noise.

12 Claims, 3 Drawing Sheets

(56) References Cited

U.S. PATENT DOCUMENTS

| | | | | |
|---|---|---|---|---|
| 2004/0041790 A1* | 3/2004 | O'Keeffe | G06F 3/03543 | 345/163 |
| 2005/0110759 A1* | 5/2005 | Koo | G06F 3/0312 | 345/163 |
| 2006/0028448 A1* | 2/2006 | Chou | G06F 3/0362 | 345/163 |
| 2007/0146324 A1* | 6/2007 | Blandin | G06F 3/0362 | 345/163 |
| 2007/0188453 A1* | 8/2007 | O'Sullivan | G06F 3/0312 | 345/163 |
| 2007/0252826 A1* | 11/2007 | Peng | G06F 3/0362 | 345/184 |
| 2011/0227828 A1* | 9/2011 | Blandin | G06F 3/03543 | 345/163 |
| 2013/0027308 A1* | 1/2013 | Peng | G06F 3/03543 | 345/163 |
| 2013/0141335 A1* | 6/2013 | Chen | G06F 3/03543 | 345/163 |
| 2013/0321272 A1* | 12/2013 | Deng | G06F 3/0362 | 345/163 |
| 2018/0364817 A1* | 12/2018 | Ota | G06F 3/0362 | |

* cited by examiner

MOUSE WITH SOUNDLESS SCROLL WHEEL MODULE

FIELD OF THE INVENTION

The present invention relates to a mouse with a soundless scroll wheel module.

BACKGROUND OF THE INVENTION

Currently, a mouse is a tool usually used in people's daily life. When someone edits a file at work, plays computer games for recreation, or the like, a mouse is needed to select or drag a file or a menu on a display screen.

A conventional mouse mainly includes a mouse body, a scroll wheel, a ratchet wheel, a strut, a spring, and an encoder. The scroll wheel, the ratchet wheel, the strut, the spring, and the encoder are installed in the mouse body. The scroll wheel is separately connected to the ratchet wheel and the encoder. One side of the strut and the ratchet wheel are engaged with each other. One end of the spring is connected to the strut and the other end of the spring is connected to the mouse body, so that the scroll wheel is rolled to drive the ratchet wheel to rotate. The ratchet wheel and the strut are engaged with each other, so that a continuous stop hand feeling can be generated when the scroll wheel is rolled.

However, as known to all, although the mouse can generate a continuous stop hand feeling by means of mutual engagement between the ratchet wheel and the strut when the scroll wheel is rolled, collision and friction between the ratchet wheel and the strut generate noise because the ratchet wheel and the strut are both components made of hard materials. The sound of rolling the scroll wheel of the mouse easily disturbs nearby colleagues while at work, and this urgently needs to be improved.

SUMMARY OF THE INVENTION

A main objective of the present invention is to provide a mouse with a soundless scroll wheel module.

In a preferred embodiment, the present invention provides a mouse with a soundless scroll wheel module, including a mouse body and a soundless scroll wheel module. The soundless scroll wheel module is installed in the mouse body. The soundless scroll wheel module includes a supporting frame, a scroll wheel body, a mute inner ratchet wheel, a strut, an elastic component, and an encoding component. The supporting frame is fixed in the mouse body. The scroll wheel body is disposed in the supporting frame and is pivotally connected to the supporting frame. One side of the scroll wheel body is provided with an installation area. The mute inner ratchet wheel is installed in the installation area to be connected to the scroll wheel body. The strut includes a pivotal connection segment and an engagement segment. The pivotal connection segment is pivotally connected to the mouse body and the engagement segment and the mute inner ratchet wheel are engaged with each other. One side of the elastic component is connected to the supporting frame and the other side of the elastic component is connected to the strut. The encoding component is connected to the scroll wheel body and is electrically connected to the mouse body. In this way, an effect of reducing rolling noise is achieved.

Preferably, the mute inner ratchet wheel includes a flexible annular body and multiple flexible ratchets. An outer side surface of the flexible annular body is connected to an inner wall surface of the installation area. Each flexible ratchet extends out from an inner side surface of the flexible annular body. The engagement segment and the flexible ratchets can be engaged with each other. Preferably, each flexible ratchet extends out from the inner side surface of the flexible annular body towards the installation area. The flexible ratchets are equidistantly arranged along the inner side surface of the flexible annular body. Preferably, the flexible annular body and the flexible ratchets are concentrically disposed. A cross section of the flexible annular body and a cross section of each flexible ratchet are both L-shaped. Preferably, the flexible ratchets and the flexible annular body form a zigzag surface with continuous zigzags in the installation area. The engagement segment can be smoothly connected to the zigzag surface. Preferably, the engagement segment extends out from the pivotal connection segment. Preferably, the flexible annular body and the flexible ratchets are components made of rubber materials, polyurethane materials, or silicon materials.

Preferably, the soundless scroll wheel module further includes a non-slip outer ring component. The outer ring component is sleeved outside the scroll wheel body and is fixed on an outer surface of the scroll wheel body. Preferably, the non-slip outer ring component, the scroll wheel body, and the mute inner ratchet wheel are concentrically disposed. In this way, when the scroll wheel body is rolled, a situation of being eccentric can be avoided and an effect of saving labor and improving the use fluency can be achieved.

DETAILED DESCRIPTION OF THE PREFERRED EMBODIMENT

Figure 1:
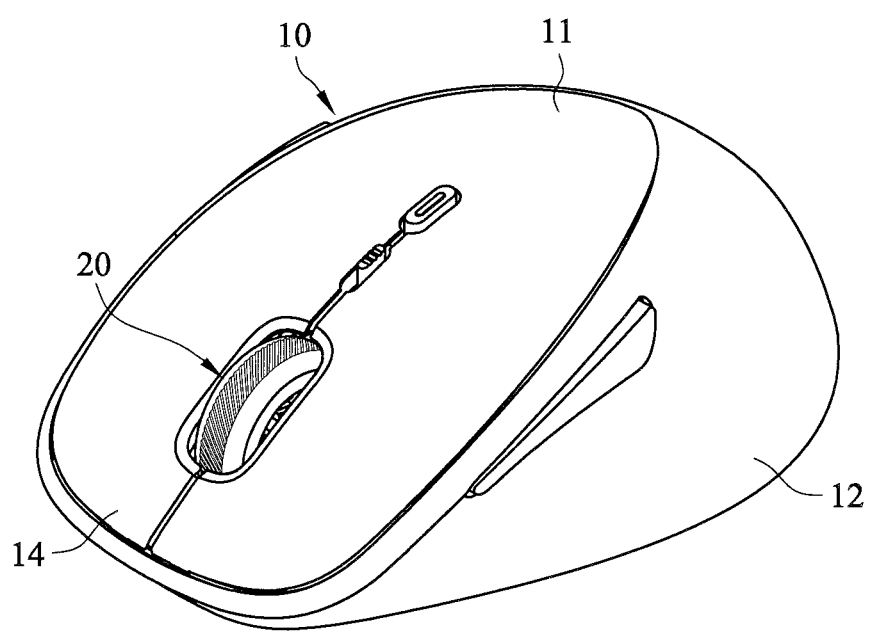
FIG. 1 is a three-dimensional view of a mouse with a soundless scroll wheel module according to the present invention.
Figure 2:
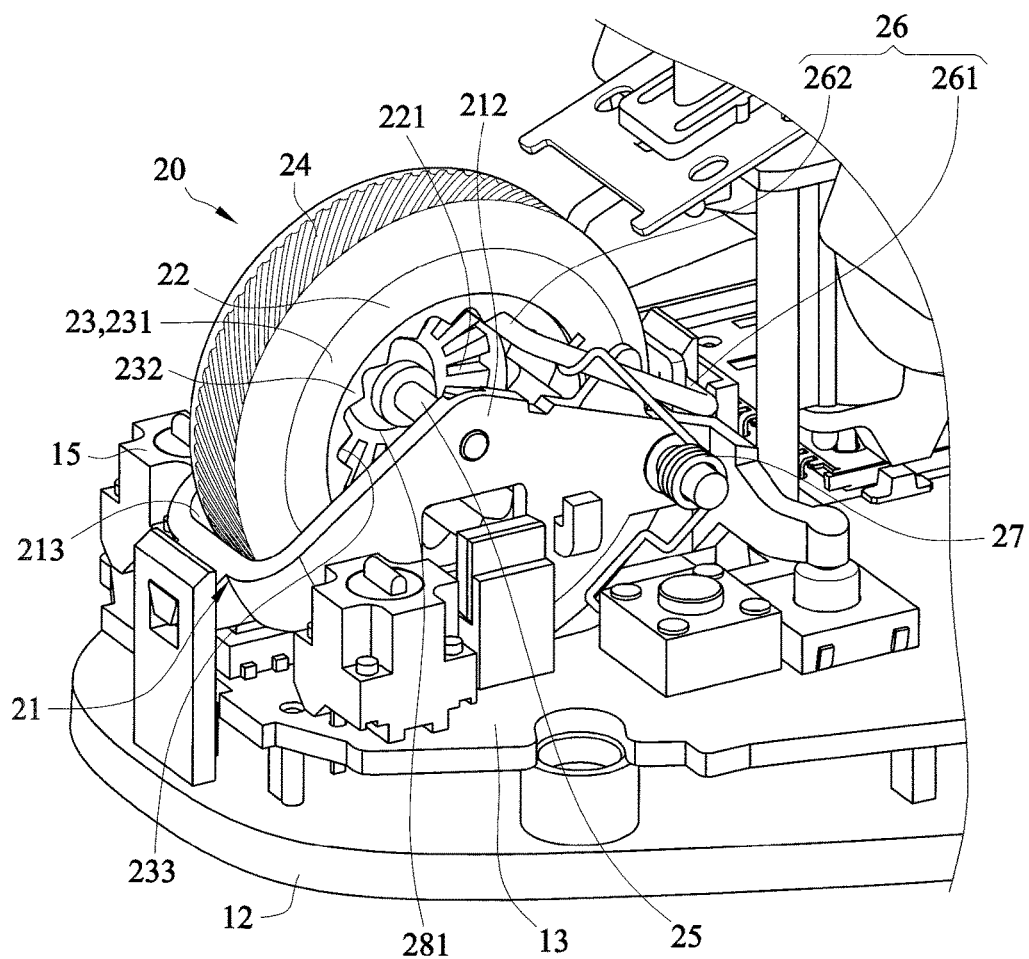
FIG. 2 is a schematic diagram of a mouse with a soundless scroll wheel module according to the present invention.
Figure 3:
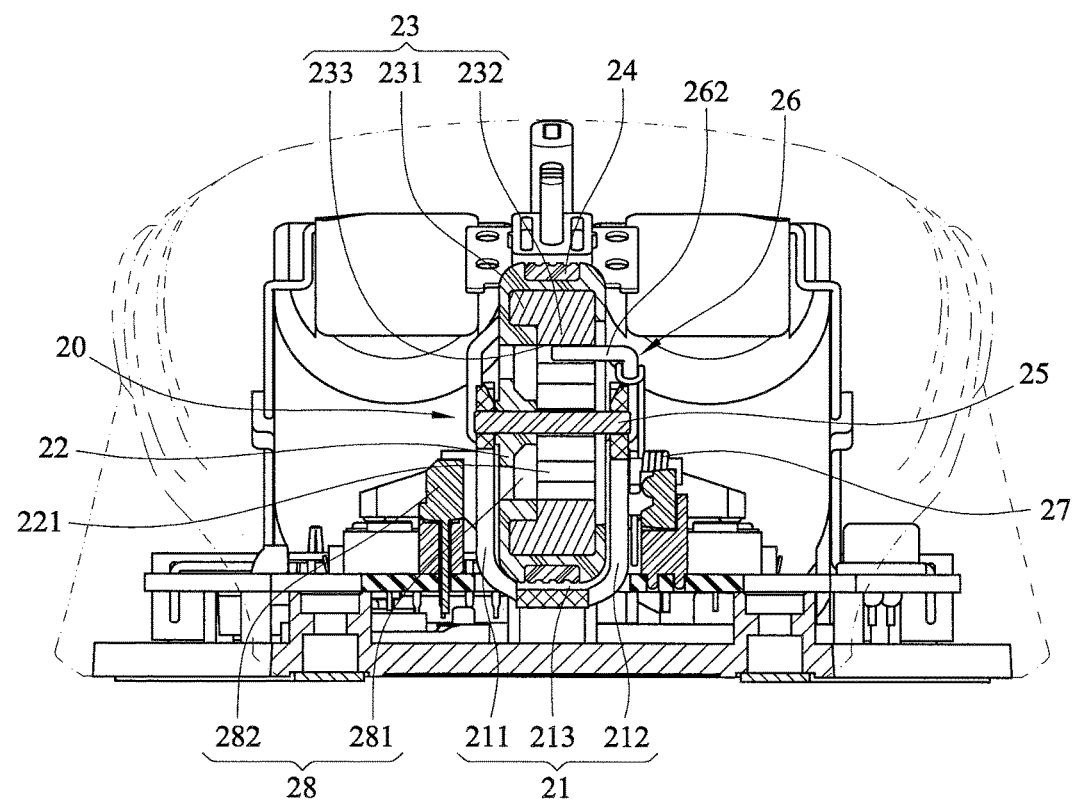
FIG. 3 is a cross-sectional view of a mouse with a soundless scroll wheel module according to the present invention.

Referring to FIG. 1 to FIG. 3, a three-dimensional view, a schematic diagram, and a cross-sectional view of a mouse with a soundless scroll wheel module according to the present invention are shown. A mouse 100 with a soundless scroll wheel module includes a mouse body 10 and a soundless scroll wheel module 20.

The mouse body 10 includes an upper housing 11, a lower housing 12, a circuit board 13, a pair of buttons 14, and a pair of button sensing elements 15. The upper housing 11 covers the lower housing 12, and an interior space is formed between the upper housing 11 and the lower housing 12. The circuit board 13 is installed in the interior space of the mouse body 10 and is fixed onto the lower housing 12. The pair of buttons 14 is disposed on the upper housing 11. The pair of button sensing elements 15 is disposed in the interior space of the mouse body 10, and the pair of button sensing elements 15 is fixed on the circuit board 13 and is electrically connected to the circuit board 13. Each button 14 is connected to each button sensing element 15.

The soundless scroll wheel module 20 is installed in the accommodating space of the mouse body 10. The soundless scroll wheel module 20 includes a supporting frame 21, a scroll wheel body 22, a mute inner ratchet wheel 23, a non-slip outer ring component 24, a connecting shaft 25, a strut 26, an elastic component 27, and an encoding component 28.

The supporting frame 21 includes a first supporting member 211 and a second supporting member 212. A bottom of the first supporting member 211 and a bottom of the second supporting member 212 are separately fixed on the lower housing 12. An accommodating space 213 is formed between the first supporting member 211 and the second supporting member 212.

The scroll wheel body 22 is disposed in the accommodating space 213. One side of the scroll wheel body 22 is provided with an installation area 221, and the scroll wheel body 22 is separately and pivotally connected to the first supporting member 211 and the second supporting member 212. The second supporting member 212 is located on one side, adjacent to the installation area 221, of the scroll wheel body 22 and the first supporting member 211 is located on one side, far from the installation area 221, of the scroll wheel body 22.

The mute inner ratchet wheel 23 is installed in the installation area 221 so as to be connected to the roller body 22. The mute inner ratchet wheel 23 includes a flexible annular body 231 and multiple flexible ratchets 232. An outer side surface of the flexible annular body 231 is connected to an inner wall surface of the installation area 221. Each flexible ratchet 232 extends out from an inner side surface of the flexible annular body 231 towards the installation area 221. The flexible ratchets 232 are equidistantly arranged along the inner side surface of the flexible annular body 231. The flexible annular body 231 and the flexible ratchets 232 are concentrically disposed. A cross section of the flexible annular body 231 and a cross section of each flexible ratchet 232 are both L-shaped. The flexible ratchets 232 and the flexible annular body 231 form a zigzag surface 233 with continuous zigzags in the installation area 221. The flexible annular body 231 and the flexible ratchets 232 are components made of rubber materials, polyurethane materials, or silicon materials, and this application is not thereto.

The non-slip outer ring component 24 is sleeved outside the scroll wheel body 22 and is fixed on an outer surface of the scroll wheel body 22. The non-slip outer ring component 24, the scroll wheel body 22, and the mute inner ratchet wheel 23 are concentrically disposed. In this way, when the scroll wheel body 22 is rolled, a situation of being eccentric can be avoided. Moreover, the non-slip outer ring component 24 may be components made of rubber materials, polyurethane materials, or silicon materials, and this application is not thereto.

The connecting shaft 25 is connected to the scroll wheel body 22 and passes through the installation area 221. One side of the connecting shaft 25 is pivotally connected to the first supporting member 211 and the other side of the connecting shaft 25 is pivotally connected to the second supporting member 212. The scroll wheel body 22 is pivotally connected to the supporting frame 21 by using the connecting shaft 25, so that the scroll wheel body 22 can roll in the accommodating space 213 of the supporting frame 21. Each flexible ratchet 232 extends out from the inner side surface of the flexible annular body 231 towards the connecting shaft 25. A central axis of the connecting shaft 25, a central axis of the scroll wheel body 22, and a central axis of the installation area 221 are the same.

The strut 26 includes a pivotal connection segment 261 and an engagement segment 262. The engagement segment 262 extends out from one end of the pivotal connection segment 261. The pivotal connection segment 261 is pivotally connected to the mouse body 10 and the engagement segment 262 and the mute inner ratchet wheel 23 are engaged with each other. The engagement segment 262 and the flexible ratchets 232 can be engaged with each other, and the engagement segment 262 can be smoothly connected to the zigzag surface 233 of the mute inner ratchet wheel 23. One side of the elastic component 27 is connected to the second supporting member 212 and the other side of the elastic component 27 is connected to the engagement segment 262 of the strut 26. The elastic component 27 is a spring.

The encoding component 28 is an optical encoder. The encoding component 28 includes a rotation disk 281 and a signal receiving unit 282. The rotation disk 281 is installed on a side surface, far from the installation area 221, of the scroll wheel body 22. The connecting shaft 25 is connected to the scroll wheel body 22 by means of connection to the rotation disk 281. The signal receiving unit 282 is fixed on the circuit board 13 of the mouse body 10 and is electrically connected to the circuit board 13. The signal receiving unit 282 is disposed corresponding to the rotation disk 281. When the scroll wheel body 22 is rolled, the scroll wheel body 22 drives the rotation disk 281 to rotate. When the signal receiving unit 282 receives displacement data of the rotation disk 281, the signal receiving unit 282 can transmit a displacement signal to a host, so as to drag a content object of a display screen.

Each flexible ratchet 232 of the mute inner ratchet wheel 23 and the engagement segment 262 of the strut 26 are engaged with each other. Therefore, when fingers of a user are in contact with the non-slip outer ring component 24 and roll the scroll wheel body 22, the engagement segment 262 slides along the zigzag surface 233 of the mute inner ratchet wheel 23. When a tooth surface of one flexible ratchet 232 abuts against the engagement segment 262, the strut 26 is driven to move downwards to press the elastic component 27, so that the elastic component 27 is compressed downwards by the engagement segment 262. Further, when the scroll wheel body 22 is rolled to make the engagement segment 262 located in a gap between one flexible ratchet 232 and another adjacent flexible ratchet 232, the elastic component 27 pushes upwards the engagement segment 262, so that the engagement segment 262 moves upwards into a gap between one flexible ratchet 232 and another adjacent flexible ratchet 232. In this way, with rolling of the scroll wheel body 22, the engagement segment 262 of the strut 26 moves in and out from the gap between the flexible ratchets 232 of the mute inner ratchet wheel 23, so that a continuous stop hand feeling can be generated when the scroll wheel body 22 is rolled and when accurate rotation is needed, the user may be provided with a clear rotation hand feeling when the scroll wheel body 22 is rolled.

However, the flexible annular body 231 and the flexible ratchets 232 of the mute inner ratchet wheel 23 are components made of rubber materials, polyurethane materials, or silicon materials, and therefore a sound of friction and collision between the engagement segment 262 of the strut 26 and the flexible ratchets 232 of the mute inner ratchet wheel 23 can be eliminated. In this way, when the scroll wheel body 22 is rolled, rolling noise can be eliminated.

In addition, when rolling the scroll wheel body 22, the user contacts the non-slip outer ring component 24 and applies a force to the non-slip outer ring component 24 by using fingers to drive the scroll wheel body 22 to roll. The non-slip outer ring component 24 may be components made of rubber materials, polyurethane materials, or silicon materials. In this way, a friction force between the non-slip outer ring component 24 and the fingers of the user can be increased, so that when the user rolls the scroll wheel body 22, the fingers can be prevented from sliding away from the non-slip outer ring component 24, thereby making power of the fingers literally transferred to the scroll wheel body 22 to implement an effect of saving labor and improving the use fluency.

According to the foregoing descriptions, it may be learned that, first, the mute inner ratchet wheel 23 is a component made of a rubber material, a polyurethane material, or a silicon material, so that when the scroll wheel body 22 is rolled, rolling noise can be eliminated; secondly, the non-slip outer ring component 24 may be a component made of a rubber material, a polyurethane material, or a silicon material, so that when the scroll wheel body 22 is rolled, an effect of saving labor and improving the use fluency can be achieved; and thirdly, the non-slip outer ring component 24, the scroll wheel body 22, and the mute inner ratchet wheel 23 are concentrically disposed, so that when the scroll wheel body 22 is rolled, a situation of being eccentric can be avoided to prolong a service life of the mouse 100.

The foregoing descriptions are merely preferred embodiments of the present invention, and are not intended to limit the patent scope of the present invention. Therefore, any equivalent change or modification completed without departing from the spirit disclosed in the present invention shall fall within the patent scope of this application.

What is claimed is:

1. A mouse with a soundless scroll wheel module, comprising:
    a mouse body; and
    a soundless scroll wheel module, installed in the mouse body, wherein the soundless scroll wheel module comprises:
    a supporting frame, fixed in the mouse body;
    a scroll wheel body, disposed in the supporting frame and pivotally connected to the supporting frame, wherein one side of the scroll wheel body is provided with an installation area; a mute inner ratchet wheel, wherein the mute inner ratchet wheel is installed in the installation area to be connected to the scroll wheel body;
    a strut, comprising a pivotal connection segment and an engagement segment, wherein the pivotal connection segment is pivotally connected to the mouse body and the engagement segment and the mute inner ratchet wheel are engaged with each other;
    an elastic component, wherein one side of the elastic component is connected to the supporting frame and the other side of the elastic component is connected to the strut; and
    an encoding component, connected to the scroll wheel body and electrically connected to the mouse body;
    wherein the mute inner ratchet wheel comprises a flexible annular body and multiple flexible ratchets; an outer side surface of the flexible annular body is connected to an inner wall surface of the installation area; each flexible ratchet extends out from an inner side surface of the flexible annular body; and the engagement segment and the flexible ratchets can be engaged with each other;
    wherein each flexible ratchet extends out from the inner side surface of the flexible annular body towards the installation area, and the flexible ratchets are equidistantly arranged along the inner side surface of the flexible annular body;
    wherein the flexible ratchets and the flexible annular body form a zigzag surface with continuous zigzags in the installation area, and the engagement segment can be smoothly connected to the zigzag surface.

2. The mouse with a soundless scroll wheel module according to claim 1, wherein the flexible annular body and the flexible ratchets are concentrically disposed, and a cross section of the flexible annular body and a cross section of each flexible ratchet are both L-shaped.

3. The mouse with a soundless scroll wheel module according to claim 1, wherein the engagement segment extends out from the pivotal connection segment.

4. The mouse with a soundless scroll wheel module according to claim 1, wherein the flexible annular body and the flexible ratchets are components made of rubber materials, polyurethane materials, or silicon materials.

5. The mouse with a soundless scroll wheel module according to claim 1, wherein the elastic component is a spring.

6. The mouse with a soundless scroll wheel module according to claim 1, wherein the soundless scroll wheel module further comprises a non-slip outer ring component; and the outer ring component is sleeved outside the scroll wheel body and is fixed on an outer surface of the scroll wheel body.

7. The mouse with a soundless scroll wheel module according to claim 6, wherein the non-slip outer ring component, the scroll wheel body, and the mute inner ratchet wheel are concentrically disposed.

8. The mouse with a soundless scroll wheel module according to claim 1, wherein the soundless scroll wheel module further comprises a connecting shaft; the supporting frame comprises a first supporting member and a second supporting member; a bottom of the first supporting member and a bottom of the second supporting member are separately fixed on the mouse body; an accommodating space is formed between the first supporting member and the second supporting member; the scroll wheel body is disposed in the accommodating space; the connecting shaft is connected to the scroll wheel body and passes through the installation area; and one side of the connecting shaft is pivotally connected to the first supporting member and the other side of the connecting shaft is pivotally connected to the second supporting member.

9. The mouse with a soundless scroll wheel module according to claim 8, wherein the first supporting member is located on one side, far from the installation area, of the scroll wheel body and the second supporting member is located on one side, adjacent to the installation area, of the scroll wheel body.

10. The mouse with a soundless scroll wheel module according to claim 8, wherein one side, far from the strut, of the elastic component is connected to the second supporting member.

11. The mouse with a soundless scroll wheel module according to claim 8, wherein each flexible ratchet extends out from the inner side surface of the flexible annular body towards the connecting shaft.

12. The mouse with a soundless scroll wheel module according to claim 11, wherein the encoding component is an optical encoder; the encoding component comprises a rotation disk and a signal receiving unit; the rotation disk is installed on a side surface, far from the installation area, of the scroll wheel body; the connecting shaft is connected to the scroll wheel body by means of connection to the rotation disk; the signal receiving unit is fixed on the mouse body and is electrically connected to the mouse body; and the signal receiving unit is disposed corresponding to the rotation disk.

* * * * *